(12) United States Patent
Steeves et al.

(10) Patent No.: US 6,212,185 B1
(45) Date of Patent: Apr. 3, 2001

(54) MULTIPLE NETWORK ADDRESS RESOLUTION

(75) Inventors: Ronald L. Steeves, Kanata; Britney Charles, Nepean; Chouinard Marc, Kanta, all of (CA)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/170,974

(22) Filed: Oct. 14, 1998

(51) Int. Cl.[7] ...................................................... H04L 12/56
(52) U.S. Cl. ............................ 370/392; 370/401; 370/428
(58) Field of Search .................................... 370/389, 392, 370/393, 395, 396, 397, 400, 401, 402, 403, 404, 405, 409, 410, 428; 709/238, 242, 243, 245, 249

(56) References Cited

U.S. PATENT DOCUMENTS

| | | | |
|---|---|---|---|
| 5,278,829 | * | 1/1994 | Dunlap ................................ 370/94.1 |
| 5,557,745 | * | 9/1996 | Perlman et al. ................. 395/200.02 |
| 5,699,347 | * | 12/1997 | Callon .................................... 370/238 |
| 5,729,689 | * | 3/1998 | Allard et al. ..................... 395/200.58 |
| 5,796,740 | * | 8/1998 | Perlman et al. ...................... 370/401 |
| 5,999,536 | * | 12/1999 | Kawafuji et al. ..................... 370/401 |

\* cited by examiner

Primary Examiner—Chi H. Pham
Assistant Examiner—Kwang B. Yao

(57) ABSTRACT

In a packet communications network comprising primary packet and secondary communication networks, a method and apparatus are disclosed for using a primary path connection to exchange additional address information between routing nodes so that the routing nodes can discover secondary path connections between routing nodes that may be used for future communication. If a packet merits additional address information, additional address information relating to a secondary communication network address for a source routing node is included in the packet header of an outgoing packet. It is determined whether an incoming packet includes additional address information and if so, the additional address information is stored so that it is associated with the primary network address of the source host node of the packet. The primary network addressing information, and any secondary network addressing information, is passed to the route calculation component of the routing node. The route calculation component makes the routing decisions and the packet is forwarded to a forwarding engine.

15 Claims, 7 Drawing Sheets

FIGURE 5

| FIELD 1 | FIELD 2 | FIELD 3 |
|---|---|---|
| NODE 46 NBMA ADDRESS | IP ADDRESS - NODE 302 | NBMA ADDRESS - NODE 304 |
|  | IP ADDRESS - NODE 308 | NBMA ADDRESS - NODE 304 |
|  | IP ADDRESS - NODE 310 | NBMA ADDRESS - NODE 304 |

32

MULTIPLE NETWORK ADDRESS RESOLUTION

FIELD OF THE INVENTION

The present invention relates to address resolution in digital communication networks. In particular, it relates to using a primary path connection to exchange additional address information between nodes so that the nodes can discover secondary path connections between nodes that may be used for future communication.

BACKGROUND OF THE INVENTION

A network consists of two or more nodes connected with one another to share resources, such as files or printers. A node is an addressable point in a network and may be a computer system, a computer terminal or a peripheral device like a printer. Each node on a network has a distinct address. A link is a communication path between two nodes.

Typically, nodes exchange information in the form of a series of bits with a definite beginning and a definite end. The information is sent as a single message, called a packet. As well as the information to be exchanged, a packet includes information about itself in the part of the packet called the header. The packet header might include the address of the source node, the address of the destination node, the size of the packet and a checksum. The checksum is a mechanism for detecting errors which allows the destination node to determine whether the packet received from the source node is the same as the packet sent. The checksum is necessary as the packet may have changed because of problems with communication between nodes on the route that the packet followed through the network. The checksum permits errors to be detected.

The movement of packets through a network is called traffic. Often, traffic on a link between two nodes has certain requirements for throughput, bandwidth or quality of service. Throughput is a measure of the rate of information transfer while bandwidth represents the difference between the highest and lowest transmission frequencies of a communication link. Quality of service characteristics may include cost, delay, delay variability and error probability of a link.

To permit nodes of a network to communicate with one another there must be an agreed method to exchange information, called a protocol. The information in a packet header may be organized according to the rules set out in a particular protocol.

In an individual network, an office for example, nodes connected to each other use a common protocol to communicate. However, a problem arises when a node of one network wishes to send information to a node of another network, which may not use the same protocol. TCP/IP (Transmission Control Protocol/Internet Protocol) is an example of a protocol. It is a set of rules developed to connect networks of various types in a large network. In the network of networks defined by TCP/IP, information may be shared over larger geographical distances and between more nodes.

Each node wishing to communicate with other nodes using TCP/IP is assigned a unique Internet Protocol (IP) address. The IP address is assigned in addition to any other address the node may already have as part of a different protocol within the local network. An IP address is a 32 bit value that, by convention, is written as four decimal values, each representing eight bits of the address, separated by a period. 130.232.68.21 is an example of this format.

Another technology that allows a network of networks is Asynchronous Transfer Mode (ATM). ATM is a standard that defines high-load, high-speed, fixed-size packet switching with dynamic bandwidth allocation. A node in an ATM network has an address with three fields, each 20 bytes in length, identifying country, area and destination system.

In the case of a node on one network wishing to send information to a node on another network, the packets are sent through a device called a router. A router is a node that connects one network with one or more other networks. The purpose of the router is to read the packet header information for the address of the node for which the packet is intended and to decide, based on information contained within the packet header and in conjunction with route tables and classification of the packet, where and how to forward the packet to the next node. The decision results in another link being established in an overall transmission path of the packet from the source node to the destination node, possibly through several intermediate nodes.

Internet Protocol (IP) networks are a subset of Broadcast Multi-Access (BMA) networks whose design allows the addressing of a message from a single source node to every node on a network (broadcast). Each node of a particular network may have the first three fields in their IP addresses in common. To send information to all nodes in a such a network, one could address the information to 130.232.68.*, where"*" represents all of the possible values of one byte. A byte consists of eight bits and may represent a value between 0 and 255 in binary arithmetic.

ATM networks, which are an example of Non-Broadcast Multi-Access (NBMA) networks, require more specific addressing. Since nodes on an ATM network share the first two address fields with nodes in other networks, broadcasting information as is done in an IP network is not possible. Other examples of NBMA networks include the Public Switched Telephone Network (PSTN) and Synchronous Optical Networks (SONET). PSTN is the familiar public telephone network. SONET is a high speed optical network.

Multimedia traffic involving voice and video services has more requirements for increased data throughput and connection controls on IP networks than the requirements for non-multimedia traffic. The bandwidth, throughput and connection controls required for certain of these multimedia applications can be provided by transmitting packets over secondary path connections involving ATM, PSTN or SONET instead of over the BMA (IP) network. For instance, a path between two nodes made up of five links when implemented with TCP/IP might provide greater throughput if three of the intermediate TCP/IP links are replaced by one ATM link. Therefore, multimedia application communication can be achieved by combining aspects of BMA networks using IP with aspects of NBMA networks. However, such NBMA networks may employ addressing conventions that do not follow the addressing conventions as exhibited by IP BMA networks. In other words, the BMA address and NBMA address for a particular node will be different. Hence, to establish a transmission path for multimedia communications over a secondary path connection requires the discovery of a secondary path address. The secondary path could be used to replace or augment the existing IP path. The discovery of a secondary path address corresponding to a destination node BMA address is referred to as "address resolution".

Existing solutions to resolving addresses between networks with different protocols, such as the Next Hop Resolution Protocol (NHRP) and NBMA Address Resolution Protocol (NARP), have a number of disadvantages. Address resolution schemes such as NARP and NHRP do not cross the border of an NBMA subnetwork and as such, all IP traffic between two subnetworks must traverse an IP router at the border. These methods also involve servers that resolve the NBMA addressing. Each node must be either a server or a client of a server and subsequently servers must exist at each hop along the path between a source client and a destination client. This requirement for contiguous deployment of NHRP capable routers within an NBMA subnetwork means that during a migration to an NHRP capable network, failure to establish a secondary path connection will occur if there are routers along the path which have not been upgraded to NHRP.

Furthermore, resolution of IP addresses to other networking addresses can result in significant delays in connection establishment between two nodes.

SUMMARY OF THE INVENTION

An object of the present invention is to provide improved address resolution for nodes connected to a primary network relating to any secondary path connections over other networks.

In accordance with an aspect of the present invention there is provided a method for inclusion of additional address information in a packet header of an outgoing packet at a routing node of a primary packet communication network, said additional address information associated with said routing node; said additional address information relating to a secondary communication network; said packet header including a destination host node primary network address and a source host node primary network address; said routing node having secondary path connections to at least one secondary communication network and at least one additional address associated with each of said secondary communication networks; said routing node including a route calculation component, a table associated with said routing node, at least one forwarding engine associated with said primary packet communication network and at least one forwarding engine associated with each of said secondary communication networks; said method comprising the steps of: (A) determining whether said source host node is zero hops away; if step (A) determines that said source host node is zero hops away, adding to said packet header said additional address information; forwarding said destination host node primary network address to said route calculation component; calculating an outbound path for said packet; forwarding said packet to one of said plurality of forwarding engines for outbound flow.

In accordance with another aspect of the invention, there is provided a method for discovery within an incoming packet and storage of additional address information relating to a path connection over a secondary communication network at a routing node of a primary packet communication network, said additional address information associated with said routing node; said incoming packet including a packet header; said packet header including a primary network address for a source host node and a primary network address for a destination host node; said routing node having secondary path connections to at least one secondary communication network and at least one additional address associated with each of said secondary communication networks; said routing node including a route calculation component, a table associated with said routing node, a forwarding engine associated with said primary packet communication network and at least one forwarding engine associated with each of said secondary communication networks; said method comprising the steps of: (a) receiving said incoming packet at said routing node; (b) determining whether said packet header of said incoming packet includes said additional address information; (c) if said packet header is determined to include said additional address information, storing said included additional address information in said table associated with said source host node primary network address.

An advantage of the present invention is the capability to allow data flow to continue to the destination node while address resolution of NBMA paths is occurring. Such a capability is provided while eliminating the requirements to generate address resolution request packets as per the NBMA NHRP proposals. Another advantage of the present invention is that end and intermediate nodes not having connections to secondary communication networks or the capability to recognize or act on additional address information are not burdened by the information.

BRIEF DESCRIPTION OF THE DRAWINGS

The present invention will be further understood from the following description with references to the drawings in which:

FIG. 5 illustrates a table in which the data is stored in accordance with an embodiment of the present invention.

DETAILED DESCRIPTION OF THE PREFERRED EMBODIMENTS

Figure 1:
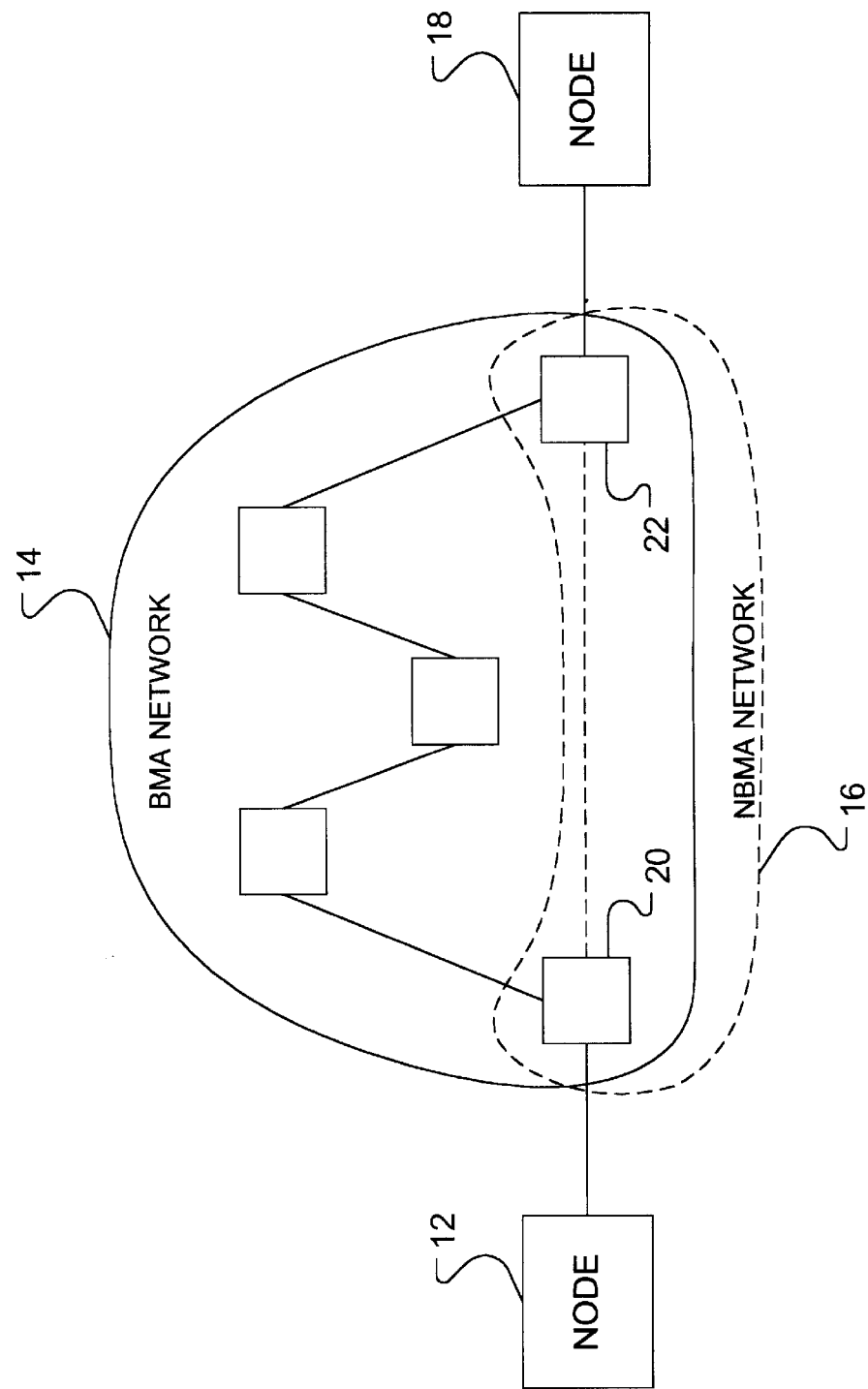
FIG. 1 illustrates, in a schematic diagram, two nodes and two types of networks through which the two nodes communicate.

Referring to FIG. 1, there is illustrated in a block diagram two host nodes 12, 18 connected to a BMA network 14 and an NBMA network 16. An embodiment of the present invention allows a routing node to discover a secondary path connection to another routing node by adding additional address information related to the secondary path connection to packets transmitted over the primary path connection. For instance, a routing node 20 may discover the existence of an NBMA path to another routing node 22 through the exchange of BMA traffic over a BMA network 14 between the two nodes.

Figure 2:
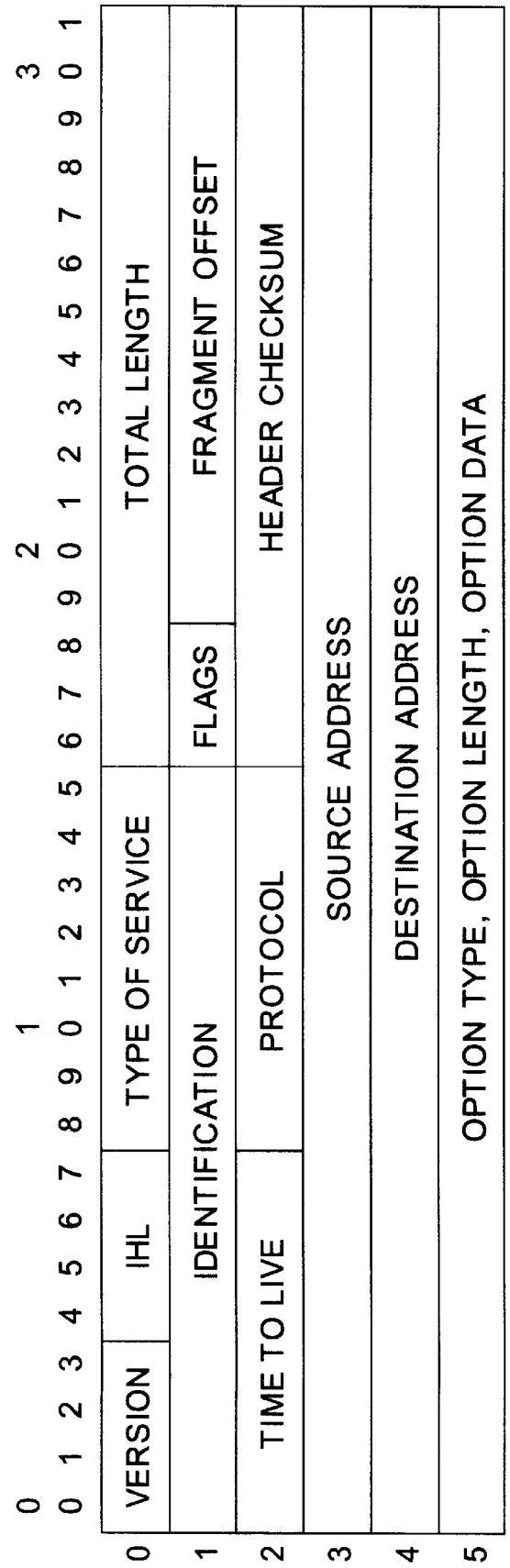
FIG. 2 illustrates, the elements of an Internet Protocol packet header.

An example of the structure of a packet header is shown in FIG. 2. The first field indicates the version number of the protocol in use in the rest of the header. This example uses the version four protocol (IPv4). The IHL field holds a value representing the length of the header and hence is a pointer to the start of the data. The Type of Service field, and potentially other fields, provides an indication of the quality of service desired. The Total length field bears a value for the length of the entire packet including header and data payload. The Identification field maintains a value that aids the receiving node in reassembling fragments of a unit of information that may be more that one packet long. The Flag field holds various control flags related to the fragmentation of data. The Fragment Offset field indicates where in the unit of information this fragment belongs. The Time to Live field indicates the maximum time the packet is allowed to remain in the Internet system. The Protocol field indicates the next level protocol used in the data portion of the packet. The Checksum field maintains a checksum on the header only. The Source Address field (with the address of the source host node) and the Destination Address field (with the address of the destination host node) are found at the end of the fixed size part of the header. The Options field has a variable size and may include only an Option Type field or all three of Option Type field, Option Length field and Option data field.

In accordance with this embodiment of the present invention, the IPv4 packet header Option Data field is modified. As well, modifications are made to the packet header Option Type field to indicate the presence of additional address information. For IPv6 packet headers, additional address information may be added to the expanded Source Address field or added to subsequent packet fields. Following the addition of the additional address information, the packet header Total Length field and the Header Checksum field for IPv4 and Payload Length field and the Header Checksum field for IPv6 are updated in a manner known to those skilled in the art.

Figure 3:
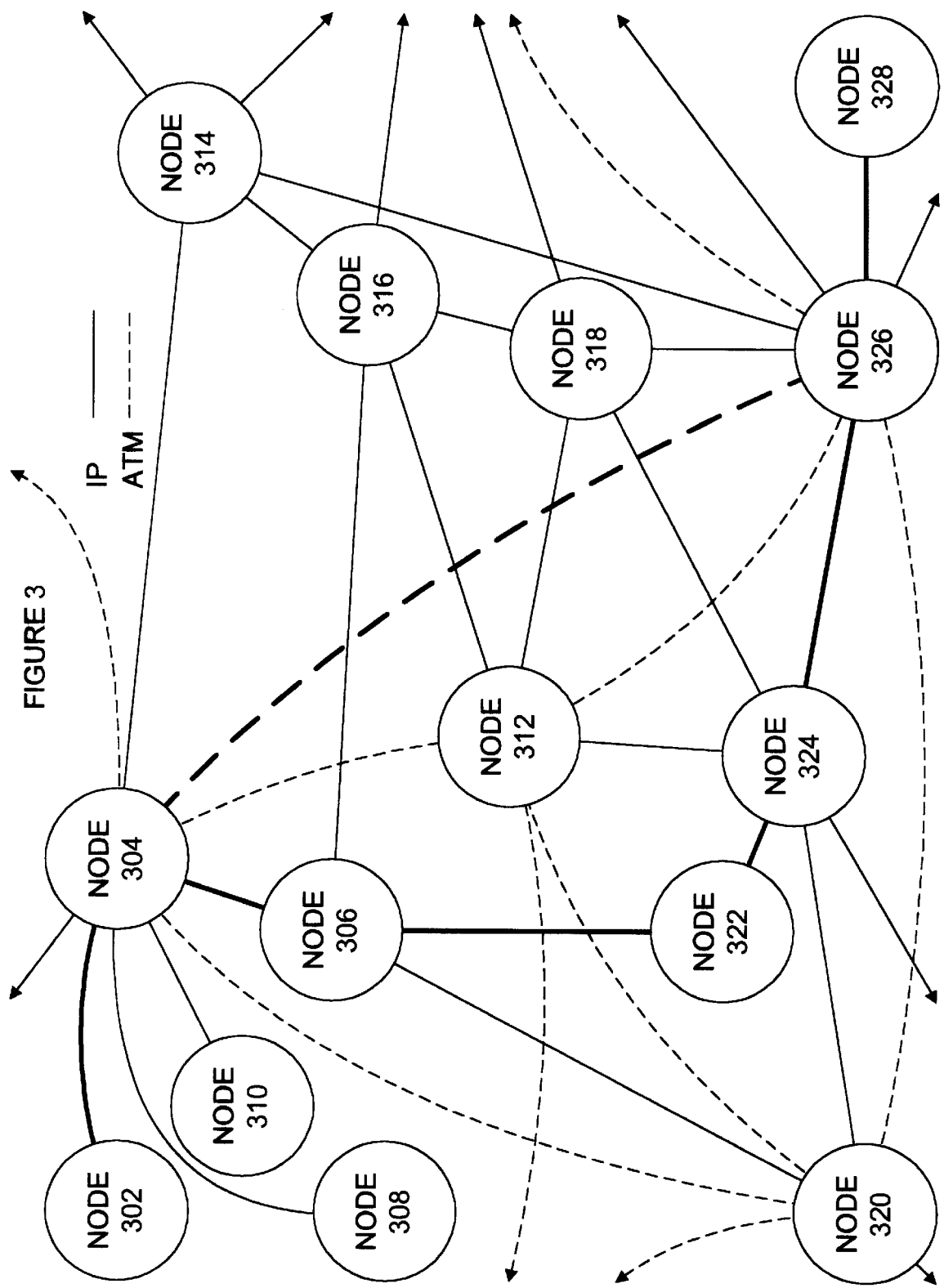
FIG. 3 illustrates, in a schematic diagram, fourteen nodes.

Referring to FIG. 3, several nodes are illustrated, as well as the connections between them. The solid lines represent TCP/IP connections while the dashed lines represent ATM connections. An instance of a path through network which a packet may travel is presented as heavier solid lines. For example, nodes 304, 306, 322, 324 and 326 may represent routing nodes in a path from node 302, the packet source host node, and node 328, the packet destination host node. Routing nodes 304 and 326 have a secondary path connection over an ATM network. In this example, the source routing node 304 and destination routing node 326 employ an embodiment of the present invention. In overview, a packet leaving the source host node 302 arrives at source routing node 304. Upon receipt of the packet, source routing node 304 examines the packet header and refers to its route tables to determine if the source host node 302 is zero hops from source routing node 304. If source routing node 304 determines that source host node 302 is zero hops from source routing node 304, and determines that it has not done so previously, source routing node 304 amends the packet header to include the ATM address of source routing node 304. Upon receipt of the packet, first intermediate routing node 306 sends the packet to second intermediate routing node 322. Second intermediate routing node 322 forwards the packet to third intermediate node 324. Third intermediate node 324 sends the packet to destination routing node 326 which in turn forwards the packet to destination host node 328. Destination host node 326 records, in a table, the IP address of source host node 302 and associates with it the ATM address of source routing node 304.

In the future, should node 326 become a source routing node for a packet whose destination is host node 302, source routing node 326 would, when querying its table to determine whether any addresses relating to secondary paths are associated with the IP address of destination host node 302, find the ATM address for destination routing node 304. Source routing node 326 may then choose to route the packet to destination routing node 304 on the ATM network rather than on the IP network. Both the packet and the routing information is passed to a forwarding engine in node 326 which is capable of sending the packet on the ATM network.

Figure 4:
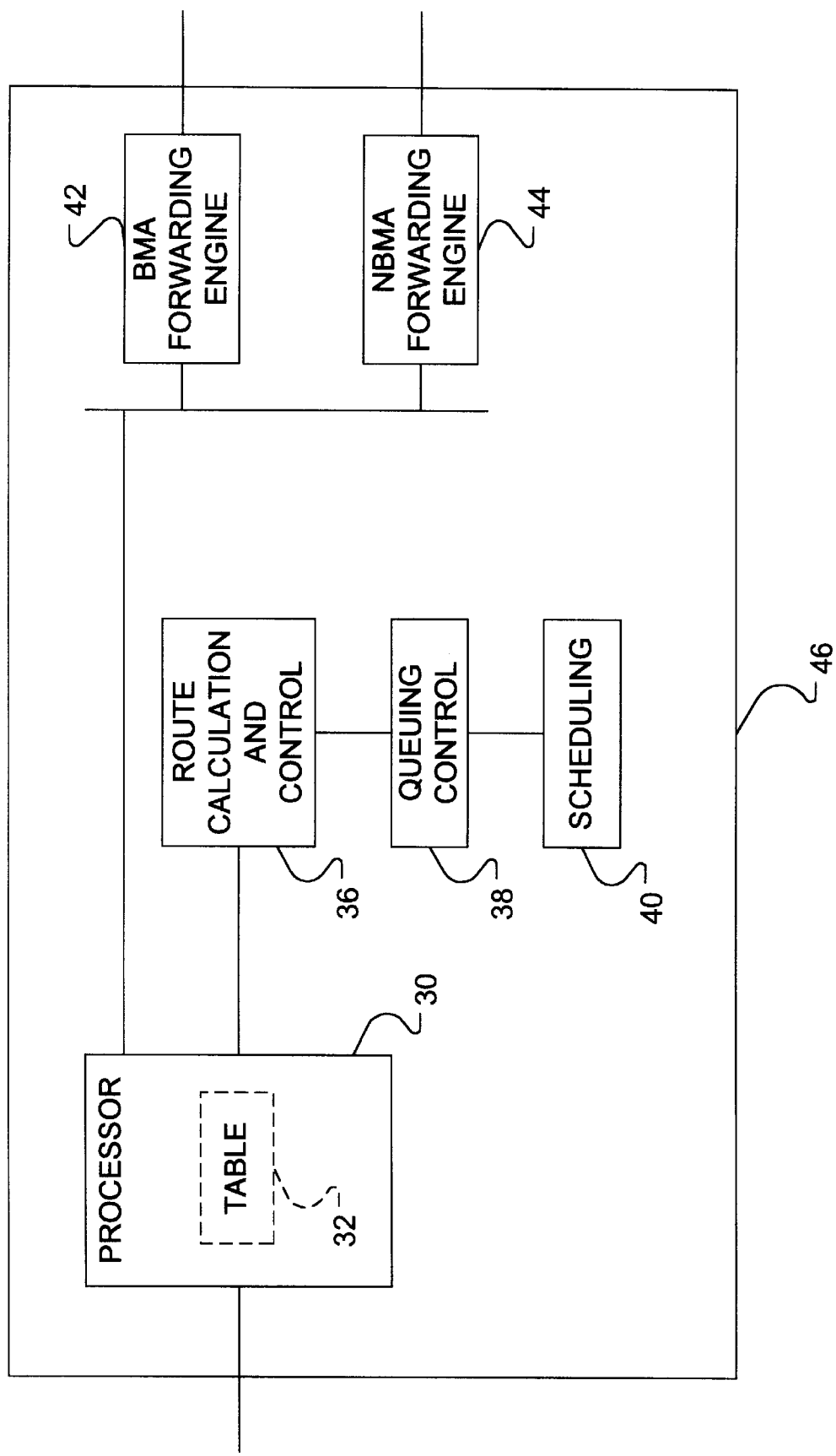
FIG. 4 illustrates, in a block diagram, a node employing an embodiment of the present invention.

In overview and with reference to FIG. 4, a packet arriving at routing node 46 is examined by processor 30 to determine whether the source host node of the packet is zero hops away. If the source host node of the packet is zero hops away the packet header is again examined to determine if the packet includes additional address information, namely information relating to a secondary path connection. If additional address information relating to the packet source routing node is present in the packet header, a connection with packet source routing node is attempted over the secondary path connection. If the connection is successful, the additional address information is stored in a Table 32 so that it is thereby associated with the BMA address of the source host node. Associated additional address information, if present in the Table 32 and associated with the destination host node BMA address, is forwarded to a route calculation and control device 36. Regardless of the presence of associated additional address information in the Table 32, the BMA address of the destination host node is forwarded to a route calculation and control device 36.

Processor 30 consults route calculation and control 36 to determine the path on which to transmit the packet and forwards the packet to one of a plurality of forwarding engines of which two 42, 44 are shown. The operation of forwarding engines is assumed to be known to a person skilled in the art.

Referring to FIG. 5, field 1 of the Table 32 of FIG. 4 is populated with the NBMA address or addresses of routing node 46. Various methods are used in populating field 1 including operator administrative procedures and automated processes familiar to the industry. Field 2 is used to store the IP address of other IP addressable devices or host nodes comprising an IP communications network known to routing node 46. Field 3 is used to store the additional address information associated with the IP address contained in field 2.

In the following, IPv4 is utilised as the primary path connection over which NBMA addressing information is exchanged. It should be clear to those skilled in the art that the invention could allow a connection between nodes on any network to exchange additional address information regarding connections on any other network.

Figure 6:
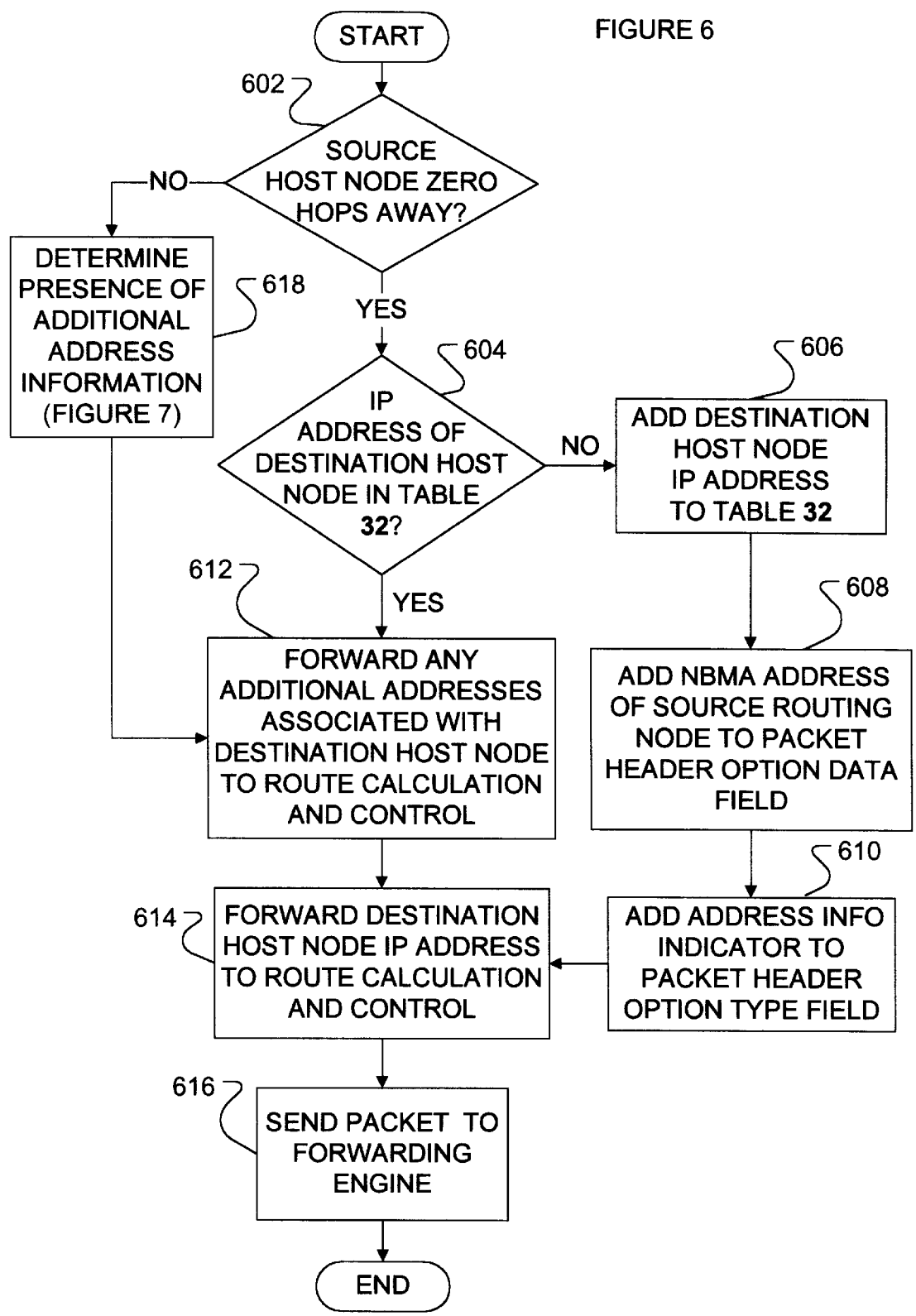
FIG. 6 illustrates, in a flow diagram, the computing operations performed in accordance with an embodiment of the present invention.
Figure 7:
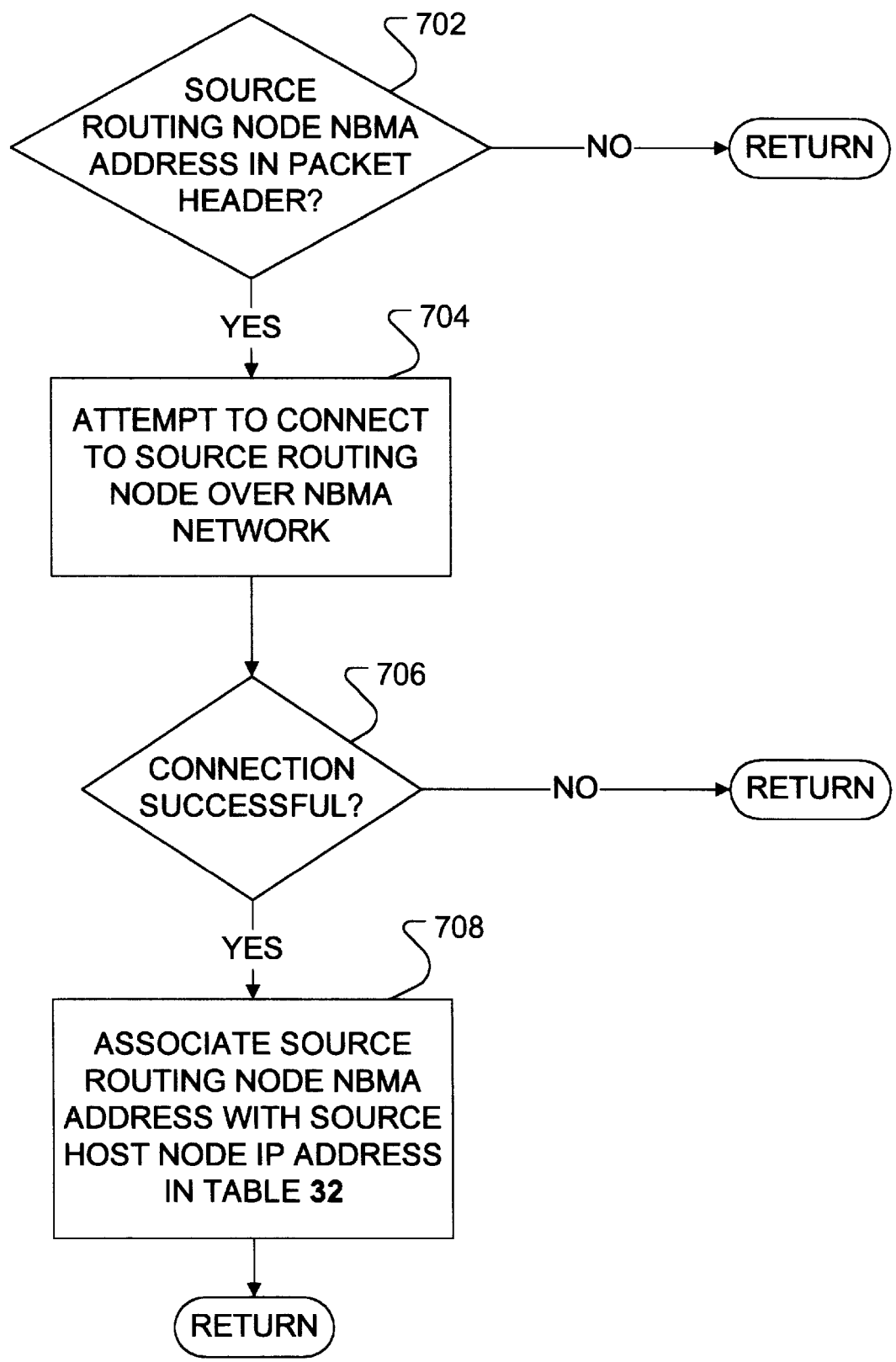
FIG. 7 illustrates, in a flow diagram, the computing operations performed upon receipt of a packet in accordance with an embodiment of the present invention.

FIGS. 6 and 7 represent computing operations performed by processor 30 using an embodiment of the invention upon the receipt of a packet. Referring also to FIG. 4, which identifies parts comprising a routing node, the process has the following steps:

Step A

It is determined whether the source host node of an incoming packet is zero hops away (step 602). This may be accomplished through reference to a value in the Time to Live field of the packet header. Typically, a value of 255 indicates that the source host node is zero hops away. Alternatively, a routing node receiving the packet may consult a table populated with addresses of those host nodes that are zero hops away. Where the source host node is more than zero hops away, the process advances to step D. If the source host node is zero hops away, the process advances to step B.

Step B

A query to the Table 32 of FIG. 4 is performed (step 604). Where a match occurs between the IP address of the destination host node and an IP address in field 2, the process advances to step G. If there is no match, the process advances to step C.

Step C

The destination host node IP address is added to the Table 32 (step 606). The packet header is then modified by the processor 30 to include the NBMA address of routing node 46 in the Option Data field (step 608) and an address information indicator in the Option Type field (step 610). The address information indicator signifies that the Option Data field contains NBMA address information. Format and data filling of Option Type field are performed to comply with industry conventions. Upon completion of this step, the process advances to step G.

Step D

The header of the packet entering routing node 46 at the processor 30 is examined to determine whether additional address information relating to the source host node may be learned (step 618). The packet header includes the IP address of the source host node and the IP address of the destination host node. The packet may have an NBMA address of the source routing node included in the packet header Option Data field. If the packet is determined to contain an NBMA address within the packet header Option Data field (step 702), the process advances to step E. If the packet header Option Data field does not contain an NBMA address the process advances to step G.

Step E

An attempt is made to connect over the NBMA network to the source routing node of the present packet (step 704). The success of the connection is evaluated (step 706). If a connection over the NBMA network is successful, the process advances to step F. If the attempt to connect fails, the process advances to step G.

Step F

The NBMA address of the source routing node, discovered in step D, is stored in field 3 of Table 32 (step 708) associated with the IP address of the source host node. The process then advances to step G.

Step G

Any NBMA addresses discovered in field 3 of the Table 32 of FIG. 3 corresponding to the destination host node IP address are passed to route calculation and control 36 (step 612). Route calculation and control 36 makes routing decisions, in conjunction with queuing control 38, which determines the order of packets, and scheduling 40, which determines the timing of the packets. The process advances to step H.

Step H

The IP address of the destination host node is passed to route calculation and control 36 (step 614). The process advances to step I.

Step I

The packet is then delivered to one of a plurality of forwarding engines 42, 44 for outbound flow (step 616).

One forwarding engine 42 is associated with packet forwarding via the primary (IP) route while the other forwarding engine 44 is associated with packet forwarding via the secondary (NBMA) route. Routing decisions by route calculation and control 36 are made based on the addresses associated with a destination host node IP address and use methods not disclosed in the present invention to determine a route over one of a plurality of NBMA and BMA networks.

Optionally, while the discovery and storage of additional address information (step 618) is occurring with regard to a particular packet, subsequent incoming packets may be forwarded directly to the route calculation component (step G, above).

In accordance with a further embodiment of the invention a routing node may apply a time limit to the retention of the addresses in fields 2 and 3 of the Table 32. This time limit is used to accommodate any changes in addresses that may occur periodically and to limit the size of the table.

In accordance with another aspect of the invention, nodes not employing the invention may perform packet inspection, identification, route calculation and forwarding regardless of additional address information in the packet header Option Data field.

Other modifications will be apparent to those skilled in the art and, therefore, the invention is defined in the claims.

We claim:

1. A method for inclusion of additional address information in a packet header of an outgoing packet at a routing node of a primary packet communication network, said additional address information associated with said routing node;

said additional address information relating to a secondary communication network;

said packet header including a destination host node primary network address and a source host node primary network address;

said routing node having secondary path connections to at least one secondary communication network and at least one additional address associated with each of said secondary communication networks;

said routing node including a route calculation component, a table associated with said routing node, at least one forwarding engine associated with said primary packet communication network and at least one forwarding engine associated with each of said secondary communication networks;

said method comprising the steps of:

(A) determining whether said source host node is zero hops away;

(B) if step (A) determines that said source host node is zero hops away, adding to said packet header said additional address information;

(C) forwarding said destination host node primary network address to said route calculation component;

(D) calculating an outbound path for said packet;

(E) forwarding said packet to one of said plurality of forwarding engines for outbound flow.

2. The method of claim 1, wherein step (A) comprises examining said packet header for a Time to Live value.

3. The method of claim 1, wherein step (A) comprises determining whether said source host node is present in a table of nodes that are zero hops away.

4. The method of claim 1 further comprising the following steps if step (A) determines that said source host node is zero hops away,:

(A1) determining whether said additional address information has been included in previously forwarded packets having said destination address;

(A2) if step (A1) determines said additional address information has been included in previously forwarded packets having said destination address, advancing to step (C);

(A3) if step (A1) determines said additional address information has not been included in previously forwarded packets having said destination address, signifying that said information has been included.

5. The method of claim 4 wherein said signifying step comprises storing said destination host node primary network address in a table of destinations and said determining step comprises determining whether said destination host node primary network address is present in said table of destinations.

6. The method of claim 5, wherein if a presence of said destination node primary network address in said table of destinations is determined, said method further comprises forwarding associated additional address information from said table of destinations to said route calculation component.

7. The method of claim 1, wherein step (B) further comprises a step of adding address information indicators to said packet header.

8. The method of claim 1, wherein said primary packet communication network is the Internet.

9. A method for discovery within an incoming packet and storage of additional address information relating to a path connection over a secondary communication network at a routing node of a primary packet communication network, said additional address information associated with said routing node;

said incoming packet including a packet header; said packet header including a primary network address for a source host node and a primary network address for a destination host node;

said routing node having secondary path connections to at least one secondary communication network and at least one additional address associated with each of said secondary communication networks; said routing node including a route calculation component, a table associated with said routing node, a forwarding engine associated with said primary packet communication network and at least one forwarding engine associated with each of said secondary communication networks;

said method comprising the steps of:

(a) receiving said incoming packet at said routing node;

(b) determining whether said packet header of said incoming packet includes said additional address information;

(c) if said packet header is determined to include said additional address information, storing said included additional address information in said table associated with said source host node primary network address.

10. The method of claim 9, wherein step (b) is accomplished by determining whether said incoming packet has address information indicators in said packet header.

11. The method of claim 9, wherein step (c) is performed only if a determination can be made that said additional address information has not been previously stored in said table associated with said source host node primary network address.

12. The method of claim 9, wherein if said packet header is determined to include said additional address information, step (b) further comprises the following steps:

(b1) using said included additional address information to attempt to establish a connection to said source routing node over said secondary communication network;

(b2) proceeding to step (c) only if said attempt to establish said connection to said source routing node over said secondary communication network is successful.

13. The method of claim 12, wherein step (b1) and (b2) are performed only if a determination can be made that said additional address information has not been previously stored in said table associated with said source host node primary network address.

14. The method of claim 9, wherein said primary packet communication network is the Internet.

15. The method of claim 9, further comprising a step of forwarding subsequent packets directly to a route calculation component if said discovery and storage of additional address information relating to a path connection over a secondary communication network is occurring with regard to said incoming packet.

* * * * *

UNITED STATES PATENT AND TRADEMARK OFFICE
CERTIFICATE OF CORRECTION

PATENT NO. : 6,212,185 B1
DATED : April 3, 2001
INVENTOR(S) : Ronald L. Steeves et al.

It is certified that error appears in the above-identified patent and that said Letters Patent is hereby corrected as shown below:

Title page,
Item [56], References Cited, U.S. PATENT DOCUMENTS,
Replace "5,278,829 * 1/1994 with -- 5,278,829 1/1994 --; replace "5,557,745 * 9/1996" with -- 5,557,745 9/1996 --; replace "5,699,347 * 12/1997" with -- 5,699,347 12/1997 --; and replace "5,729,689 * 3/1998" with -- 5,729,689 3/1998 --.

Column 7,
Line 55, do not begin new paragraph, replace with:
-- The packet is then delivered to one of a plurality of forwarding engines 42, 44 for outbound flow (step 616). One forwarding engine 42 is associated with packet forwarding via the primary (IP) route while the other forwarding engine 44 is associated with packet forwarding via the secondary (NBMA) route. Routing decisions by route calculation and control 36 are made based on the addresses associated with a destination host node IP address and use methods not disclosed in the present invention to determine a route over one of a plurality of NBMA and BMA networks. --

Signed and Sealed this

Twenty-fourth Day of June, 2003

JAMES E. ROGAN
*Director of the United States Patent and Trademark Office*